2,847,312

CURING MEAT EMULSION

Robert H. Harper, Park Forest, and Marvin M. Voegeli, Downers Grove, Ill., assignors to Swift & Company, Chicago, Ill., a corporation of Illinois No Drawing. Application August 29, 1955
Serial No. 531,278

3 Claims. (Cl. 99—159)

This invention relates to an improvement in the processing of cured sausage items and more particularly to an improved process which provides a product with a more intense cured color and a color of greater stability.

Historically, in the manufacture of emulsified sausage products the curing salts have been introduced during the chopping operation necessary for the formation of the meat and water emulsion. We have discovered that if the introduction of the curing salts be delayed until after preparation of the emulsion the cured product will have a considerably improved color and a color of longer duration. In addition to the late addition of the salts, it is necessary, in order to benefit from our process, that the oxygen of the air associated with meat be substantially removed from emulsion before diffusion of the nitrite salt into contact with the heme pigment.

The pigments of a freshly slaughtered animal are principally hemoglobin and myoglobin, the unoxygenated reduced forms of the heme pigments, and upon exposure to air these latter two pigments physically bond with the molecular oxygen of the air to give oxyhemoglobin and oxymyoglobin. Nitrite curing salt, upon contacting these oxy forms of the heme pigment, is thought to bring about a 100% conversion to the met forms. In the instance of hemoglobin and myoglobin, the nitrite containing curing salts effect a 50% conversion of these two pigments to the cured pigments, nitric oxide hemoglobin and nitric oxide myoglobin, with the other 50% being converted to the met forms. In order for the curing reaction to then proceed, the met pigments resulting from the effect of the nitrite salt upon both the reduced forms and the oxygenated forms of the heme pigments must be reduced to hemoglobin and myoglobin as only these latter two pigments will combine with the nitric oxide liberated from the nitrite salt to give the cured pigments of nitric oxide hemoglobin and nitric oxide myoglobin. The foregoing theoretical consideration is our best understanding of several of the possible reactions that may occur in curing and is included herein to assist in an understanding of our process but is no way to be considered as limiting the scope of our invention.

In our process, we endeavor to remove as much as possible of the oxygen associated with the meat emulsion before there has been a substantial contacting of the heme pigments by the curing salts. It is our belief that a vacuum will break the bond which holds the molecular oxygen to the oxygenated pigments, oxyhemoglobin and oxymyoglobin, thereby permitting the removal of this oxygen along with the rest of the oxygen entrapped in the emulsion. By drawing a vacuum on the emulsion before there has been a substantial contacting of the heme pigments and the curing salts, more of the heme pigments are in the reduced unoxygenated form, and less in the oxygenated form. In our experience, such a procedure is favorable to the formation of the cured color.

An object of this invention is to provide an improved process for the manufacture of cured sausage items to obtain an improved color. A further object of this invention is to provide an improved process for the manufacture of cured sausage items having a cured color of greater stability. These and other objects will be apparent to one skilled in the art from the following detailed description.

Broadly speaking, we contemplate, in our process, preparing a meat and water emulsion and thereafter substantially drawing off the oxygen associated with the meat before there is an opportunity for a substantial contacting of the heme pigments with the curing salt. Various procedures may be employed for disassociating the oxygen from the meat prior to a substantial contacting of the curing salts and the heme pigments. In one practical plant manner of operating, following the preparation of the emulsion and its transfer to a vacuum mixer, the curing salts may be spread on the top of the emulsion within the mixer, the mixer closed and a vacuum drawn for an interval of time without agitation. Following this, there is a brief mixing interval of the curing salt into the emulsion, under vacuum. The vacuum mixing interval need not be longer than approximately a minute to obtain very beneficial results. After the short mixing interval, the mixer may be opened and the emulsion removed or the vacuumization continued for a further interval of time to assure substantial complete removal of the air bubbles broken under the agitation. If there is an undue delay in the removal of the molecular oxygen after spreading of the curing salts on the surface of the emulsion within the mixer, there will be an opportunity for the curing salts to diffuse throughout the mass and there will result a 100% conversion of the oxygenated pigments to methemoglobin and metmyoglobin. And as pointed out above, in order for the curing action to then proceed, these met pigments must be reduced to hemoglobin and myoglobin. To effect such reduction there will necessarily be a drain upon the natural reducing agents present in the meat which, of course, is undesirable in that this lessens the reservoir of reducing agents available for the protection of the cured meat color when once obtained.

In our preferred method of operation, we contemplate carrying on a complete vacuumization cycle prior to the introduction of the salts as this will assure substantial removal of the oxygen prior to the introduction of the salts to the emulsion.

The following examples typify the process of my invention and are to be construed as illustrative of, and not as limiting, the scope of the invention.

*Example 1*

The meat formula used in the work of this example was made up of 130 lbs. beef, 25 lbs. veal, 20 lbs. lean pork trimmings, 200 lbs. regular pork trimmings, to which were added 112 lbs. of ice and conventional seasonings. The beef, veal, and ice and seasonings were chopped to 46° F. at which temperature the pork trimmings were added and the chopping continued to 56° F. At this point, one-half of the emulsion was transferred to a vacuum mixer, and 15 oz. of curing salts made up of 50% sodium nitrate and 50% sodium nitrite was spread over the emulsion in the mixer. The balance of the emulsion was added to the mixer and a 26" vacuum drawn for 5 minutes. After this interval, the emulsion was vacuum mixed for 2 minutes, the agitation ceased and the vacuum held for an additional 8 minutes. The meat was stuffed, smoked, chilled in the conventional manner, sliced, and examined for color characteristics. The control was handled in a like manner, except that the curing salts were introduced in conventional manner during the chopping of the meat. The product to which the curing salts had been added late had a decidedly better color than the conventionally treated lot.

Example II

The meat formulation and the preparation of the emulsion of this experiment was the same as noted in Example I. All of the emulsion was transferred to a vacuum mixer and vacuumized for 5 minutes without agitation, and then vacuum mixed for ½ minute. Following the brief mixing interval, the vacuum was retained for an additional 3 minutes, at the end of which the vacuum was broken and the curing salts spread over the surface of the machine. Again a vacuum was drawn for 3 minutes without agitation, and then vacuum mixed for an interval of 1½ minutes. Following vacuum mixing, the vacuum was retained for an additional 3 minutes. The vacuum used in the work of this example was on the order of 26"–26½" Hg. The control was of the same formula and treated in a like manner, except that the curing salts were introduced during the chopping operation. Both the control and the test lot were stuffed, smoked, chilled, and sliced in the conventional manner. Here again the test lot had a brighter color than the control, demonstrating the advantages to be gained in the practice of our process.

Example III

The meat formula used in the instant experiment consisted of 10.8 lbs. beef, 9.2 lbs, neck fat and 5 lbs. veal, to which was added 6.7 lbs. ice. The emulsion was prepared in a manner like that described both in Example I and Example II. The meat formula given is that for a single lot.

In the instance of lot No. 1, the emulsion was transferred to a vacuum mixer and ¾ oz. of curing salts made up of 50% sodium nitrate and 50% sodium nitrite was sprinkled over the top of the emulsion, the vacuum mixer closed, and a vacuum of approximately 29" Hg drawn for 5 minutes. At the end of this period the emulsion was vacuum mixed for 2 minutes and then held for an additional 8 minutes without agitation.

The second lot of the same weight and formula was transferred to the vacuum mixer and put through the same cycle of vacuumization described with reference to lot No. 1. At the end of the 15 minute cycle of vacuumization, curing salts in the same amount as in lot No. 1 was sprinkled on top of the emulsion and mixed in under atmospheric pressure.

To a third lot the curing salts were incorporated during the chopping operation in the preparation of the emulsion. Lot No. 3 was split with one-half of the emulsion being subjected to the same vacuumization cycle used in the treatment of lots Nos. 1 and 2. The other portion of lot No. 3 was not vacuumized. All lots were stuffed, smoked, chilled in the conventional manner.

It was found that lots Nos. 1 and 2 had decidedly the best color and a color panel of 3 people experienced in cured sausage processing gave these two lots a rating of 9. The portion of lot No. 3 which had been vacuumized carried a rating of 8, while the other half of that same lot was rated 6. The scale employed for being the maximum possible rating and 5 to 6 being the minimum acceptable color rating. The ratings given to the three lots above is the first observation. The product was then placed under fluorescent lights and observations made at ½, 1, 1½, and 2 hours. The relative color ratings were continued throughout the period of observation and at the 2 hour observation it was found that all the samples had faded approximately 3 points from their original values.

Example IV

The formula used in this example consisted of 81½ lbs. veal, 50 lbs. beef cheeks, 112½ lbs. beef, 125 lbs. neck fat. During the chopping operation, 80 lbs. of ice and conventional seasonings were incorporated. The emulsion was transferred to a vacuum mixer and held without agitation for 3 minutes. At the end of this interval of time, a solution of curing salts containing 6½ oz. of sodium nitrate and 6½ oz. of sodium nitrite was drawn into the vacuum mixer and mixed with the emulsion under vacuum for 3 minutes. A control handled in substantially a like manner, except for the adding of the curing salts at the conventional time during the chopping operation, was prepared.

The two batches were stuffed, smoked, and chilled. Slices were taken from both batches and vacuum packaged. The packaged products were exposed to 35 footcandles of light for a period of time with observations being made at 0, 2, 4, 6, 7, and 11 hours by a color panel of several individuals. At the initial observation, the regular product had a rating of 9 and the test lot a rating of 10. For the observations made at 2, 4, 6, 7 and 11 hours the ratings for the regular product were 6, 5, 4, 4, and no rating, and in the instance of the test lot the ratings were 7+, 6, 5, 5, 5. It will be noted at the 11th hour observation the regularly treated product had gone off color so completely that no value was assigned, whereas, in the instance of the test lot, the panel gave it a rating of 5. It will be noted that throughout the periods of observation the test lot had consistently a better color.

Obviously, many modifications and variations of the invention as hereinbefore set forth may be made without departing from the spirit and scope thereof, and therefore only such limitations should be imposed as are indicated in the appended claims.

We claim:

1. In a process for preparing a cured sausage item having an improved color, the steps comprising forming an emulsion of meat and water, substantially drawing off the oxygen associated with the meat of the emulsion before substantial contacting of the heme pigments of the meat with a curing salt, and thereafter while maintaining substantially oxygen free conditions reacting the heme pigments of said substantially oxygen free meat with curing salt to form a cured color.

2. In a process for preparing a cured sausage item having an improved color, the steps comprising forming an emulsion of meat and water in a first zone, transferring the meat emulsion to a second zone, placing curing salt on the surface of the emulsion in the second zone, drawing a vacuum without agitation on said emulsion in the second zone, and mixing said curing salts into the emulsion under vacuum to thereby react the heme pigments with said curing salts and form a cured color.

3. In a process for preparing a cured sausage item having an improved color, the steps comprising forming an emulsion of meat and water, vacuumizing the emulsion to substantially remove the oxygen therefrom and subsequently while said emulsion is vacuumized introducing and mixing into said emulsion a curing salt to thereby react the heme pigments with curing salt to form a cured color.

References Cited in the file of this patent

UNITED STATES PATENTS

| | | |
|---|---|---|
| 2,060,160 | Allen | Nov. 10, 1936 |
| 2,471,282 | Paddock | May 24, 1949 |
| 2,629,311 | Graves | Feb. 24, 1953 |
| 2,681,279 | Sloan et al. | June 15, 1954 |
| 2,742,367 | Bachert | Apr. 17, 1956 |

UNITED STATES PATENT OFFICE
CERTIFICATE OF CORRECTION

Patent No. 2,847,312                              August 12, 1958

Robert H. Harper et al.

It is hereby certified that error appears in the printed specification of the above numbered patent requiring correction and that the said Letters Patent should read as corrected below.

Column 3, lines 61 to 63, for "The scale employed for being the maximum possible rating and 5 to 6 being the minimum acceptable color rating." read -- The scale employed for evaluation of colors extends from 1 to 10 with 10 being the maximum possible rating and 5 to 6 being the minumum acceptable color rating. --; line 72, for "$81\frac{1}{2}$" read -- $87\frac{1}{2}$ --.

Signed and sealed this 21st day of October 1958.

(SEAL)

Attest:

KARL H. AXLINE

Attesting Officer

ROBERT C. WATSON
Commissioner of Patents